Figure 3:
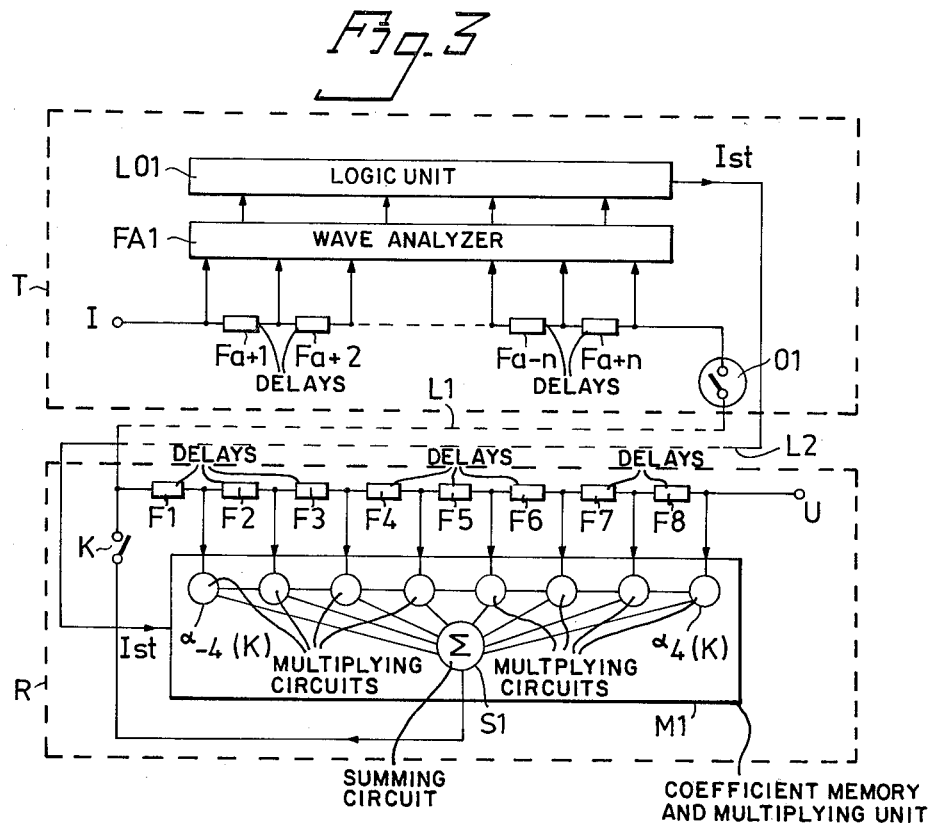

United States Patent [19]

Fjällbrant

[11] 4,271,500
[45] Jun. 2, 1981

[54] DEVICE FOR CONVERTING A NON-UNIFORMLY SAMPLED SIGNAL WITH SHORT-TIME SPECTRUM TO A UNIFORMLY SAMPLED SIGNAL

[76] Inventor: Tore Fjällbrant, Hökasvägen, pl 67, 430 80 Hovas, Sweden

[21] Appl. No.: 8,616

[22] Filed: Feb. 1, 1979

[30] Foreign Application Priority Data

Feb. 13, 1978 [SE] Sweden .............................. 7801614
Jan. 19, 1979 [SE] Sweden .............................. 7900488

[51] Int. Cl.³ .................. G10L 1/06; G06G 7/19; G06G 7/30
[52] U.S. Cl. ................... 370/23; 179/15 A
[58] Field of Search .......... 179/15 BC, 1 SA, 15 BV, 179/15 AO, 15 A, 15 AS, 15 AV; 364/724; 370/23, 19, 84, 112, 79

[56] References Cited

U.S. PATENT DOCUMENTS

| | | | |
|---|---|---|---|
| 3,548,107 | 12/1970 | Webb | 179/15 BC |
| 3,808,412 | 4/1974 | Smith | 179/15 BC |
| 4,021,616 | 5/1977 | Bots | 179/15 BV |

*Primary Examiner*—David L. Stewart
*Attorney, Agent, or Firm*—Silverman, Cass & Singer, Ltd.

[57] ABSTRACT

A device for forming omitted samples by extrapolation in a transmitted signal having non-uniform, grouped samples representing a short-time stationary signal such as speech. The grouped samples are passed through a series of delay circuits. Fourier transformation of the samples is performed to form omitted samples which are inserted in the signal between the grouped samples. The Fourier transformation is used to select multiplication coefficients which are multiplied by the sample amplitudes, with the products of the multiplication being summed to form the omitted samples. In one embodiment the extrapolation is performed in both carry forward and carry back circuits.

5 Claims, 7 Drawing Figures

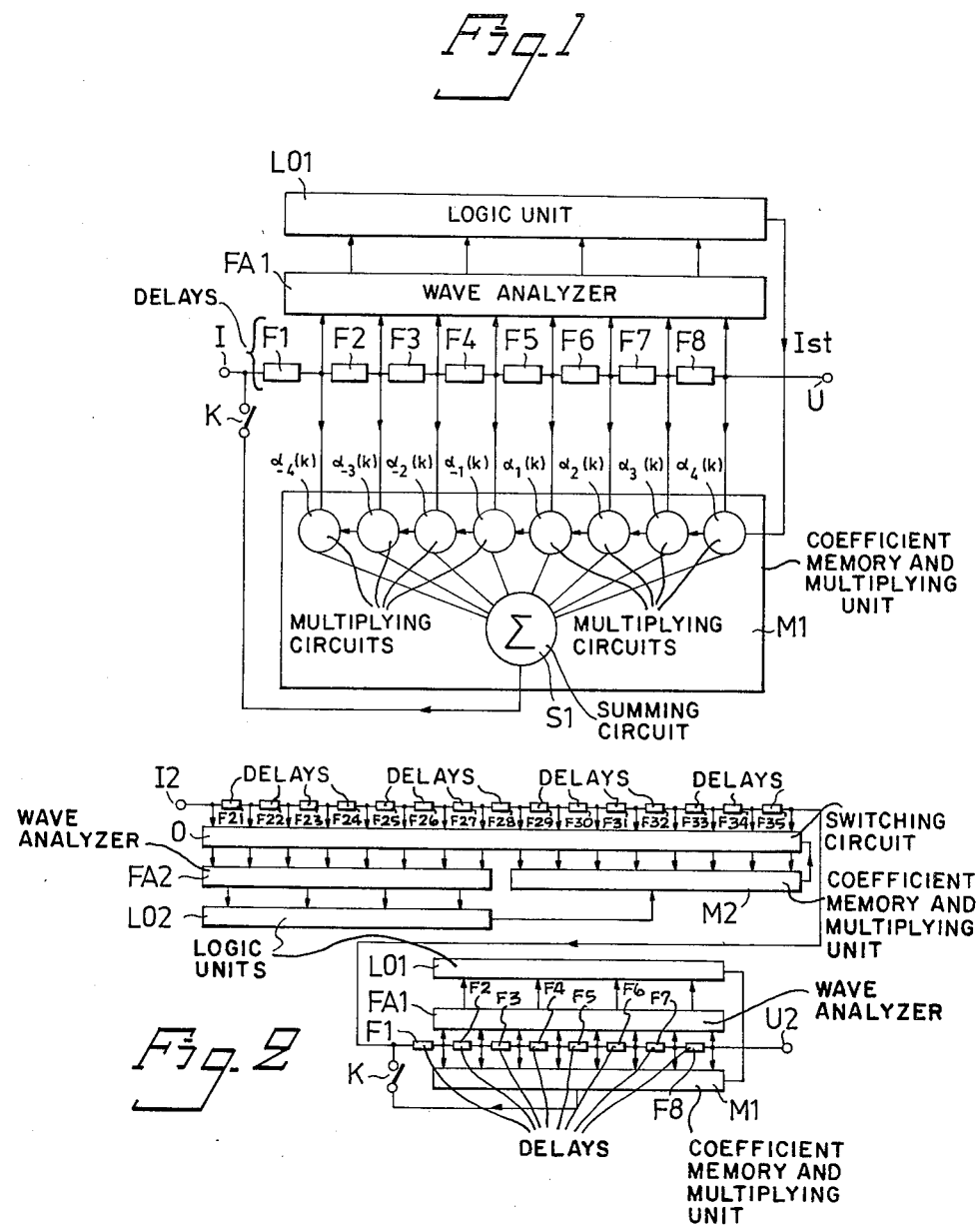

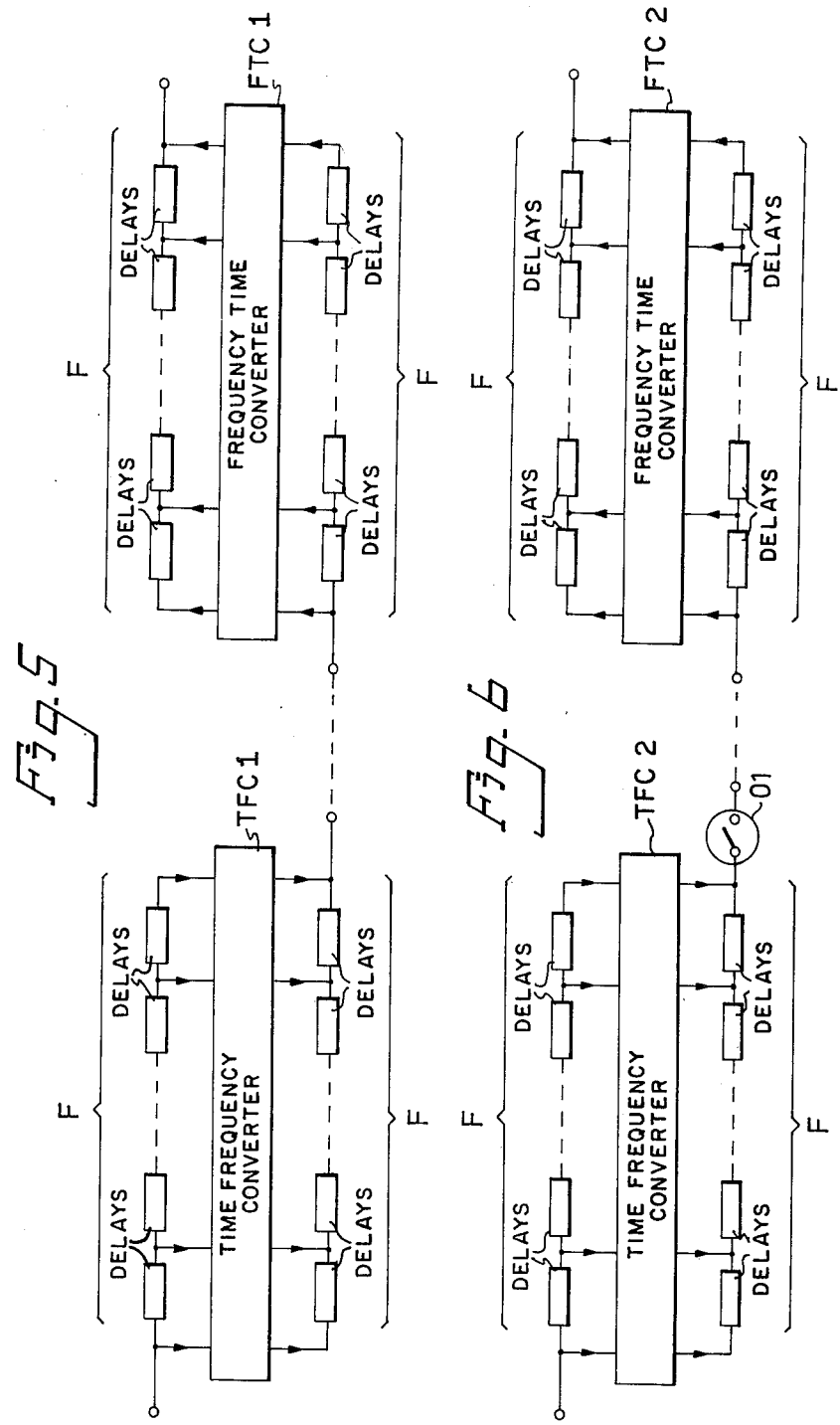

DEVICE FOR CONVERTING A NON-UNIFORMLY SAMPLED SIGNAL WITH SHORT-TIME SPECTRUM TO A UNIFORMLY SAMPLED SIGNAL

This invention relates to a device for converting a non-uniformly sampled signal with short-time spectrum to a uniformly sampled signal. Such a device can be used, for example, for the transfer of data-reduced speech signals.

A speech signal with limited bandwidth for telephony includes frequencies in the range of 300 c/s–3400 c/s. For digital transfer the speech signal is sampled with a sampling frequency of, for example, 8000 c/s. A speech signal differs from a signal of pure noise characteristics by being short-time stationary, i.e. the speech signal components a certain frequency have a duration which is very long in relation to the cycle of the highest frequency. This applies also to the transition between different sounds.

The frequency content of a sampled signal can be examined with the help of discrete Fourier transformation, by which the total frequency band 0 to 1/2T c/s, where T is the sample distance, is divided into sections equal in number to half the number of samples included in the transformation. For a signal of pure noise character every new sample is independent of previous samples, which implies that frequencies of equal importance can be found simultaneously in all sections within the frequency band 0 to 1/2T and vary in amplitude for each time shift by one sample distance. This is not the case for short-time stationary signals such as speech signals and, therefore, on the average fewer samples per time unit are required at non-uniform sampling for transferring a short-time stationary signal having the same bandwidth as a noise signal. A sampled speech signal, for example, is assumed to be transferred in such a way, that a first group of eight subsequent samples is followed by an interstice representing eight omitted samples. From the eight samples in the first group there is formed by discrete Fourier transformation, the frequency content of four sections, which can be examined by the eight given samples. It is possible to find coefficients, with the help of which, omitted samples can correctly be obtained by extrapolation for signals with frequencies within at most two of the four sections resulting from the discrete Fourier transformation of the eight known samples. It becomes apparent by the transformation, in which of two sections the highest signal amplitudes are found, and corresponding weight coefficients then are applied for a correct extrapolation of signals with frequencies within these two sections. Four sections offer six possible combinations, and the weight coefficients for these six combinations are determined in advance and stored in a coefficient memory. The coefficients are multiplied in due succession each with one of the eight samples, and the total renders the amplitude of the next following omitted sample. By repeating the operation four times, the next following four omitted samples can be extrapolated. The omitted four samples following thereafter in a corresponding way can be extrapolated successively in the other direction from the next group of eight known samples. Alternatively, all eight samples can be extrapolated in one direction, starting from the same group of eight given samples.

Figure 4A:
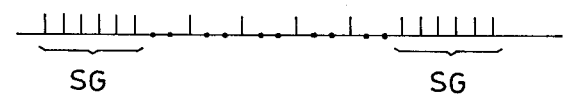
Figure 4B:
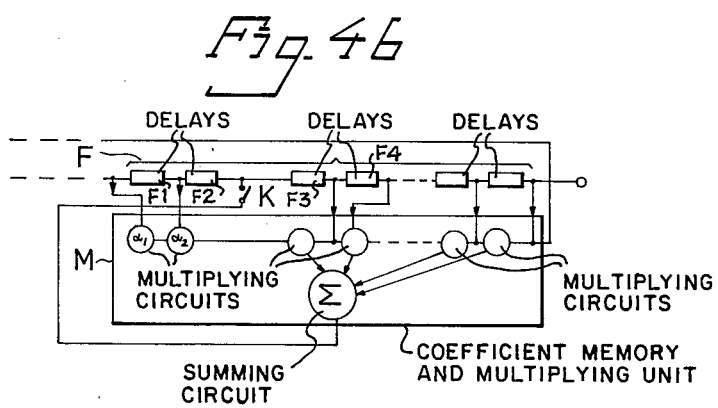

The characterizing features of devices designed according to the present invention are apparent from the attached claims. The invention is described in greater detail in the following, with reference to the enclosed drawings, in which FIG. 1 shows a device with extrapolation of omitted samples in one and the same direction from a group of eight samples, FIG. 2 shows a device with extrapolation of omitted samples in different directions from two groups of samples at the same time, FIG. 3 shows a system where a device according to FIG. 1 has been split up and arranged partly on a transmitting side and partly on a receiving side, with the transmitting side and the receiving side connected by a connecting line, FIG. 4a shows the appearance of transferred samples with interstices between groups of transferred samples, FIG. 4b shows a device suited for such a signal as the one shown in FIG. 4a, FIG. 5 shows a time-frequency-converter, and FIG. 6 shows a variant of the device shown in FIG. 5.

The device according to FIG. 1 comprises a delay chain F1 to F8 with eight delay elements F1, F2 ... F8 connected in series and a multiplying unit M1 with eight multiplying circuits $\alpha_{-4}(k), \alpha_{-3}(k) \ldots \alpha_{-1}(k), \alpha_1(k) \ldots \alpha_4(k)$ connected on the input side to connection points in the delay chain and on the output side to a common summing circuit S1. A wave analyzer FA1 is connected on the input side to the same eight connection points in the delay chain F1–F8 as the multiplying unit M1 and on the output side to four connections of a logic unit LO1 capable of comparing four signals from the wave analyzer FA1 with respect to amplitude. Logic unit LO1 emits a control signal Ist to the multiplying circuits $\alpha_{-4}(k) \ldots \alpha_4(k)$ in response to the result of the comparison made and thereby activating one of 6 multiplication coefficient sets stored in each of the multiplying circuits $\alpha_{-4}(k) \ldots \alpha_4(k)$. The coefficients are so adapted that the transfer function of the set regarding the extrapolated sample is real and close to 1 within the frequencyrange for corresponding two sections. (For speech signals the first section need not start in 0 c/s, because at telephony the range 0–300 c/s is of no interest. There is in the same way for the last section a range close to 1/2T c/s within which a signal is not transferred.) The input and output terminals of the delay chain, besides, are the input and output terminals I and U respectively, of the device. The wave analyzer FA1 is capable of performing the four mathematical operations:

$$Y_1 = \left[ \sum_{k=-4}^{4} X_k \cos\left( (|k| - 0.5) \cdot \tfrac{1}{2} \cdot \tfrac{2\pi}{8} \right) \right]^2 +$$

$$\left[ \sum_{k=-4}^{4} X_k \sin\left( \tfrac{k}{|k|} (|k| - 0.5) \cdot \tfrac{1}{2} \cdot \tfrac{2\pi}{8} \right) \right]^2$$

$$Y_2 = \left[ \sum_{k=-4}^{4} X_k \cos\left( (|k| - 0.5) \cdot \tfrac{3}{2} \cdot \tfrac{2\pi}{8} \right) \right]^2 +$$

$$\left[ \sum_{k=-4}^{4} X_k \sin\left( \tfrac{k}{|k|} (|k| - 0.5) \cdot \tfrac{3}{2} \cdot \tfrac{2\pi}{8} \right) \right]^2$$

$$Y_3 = \left[ \sum_{k=-4}^{4} X_k \cos\left( (|k| - 0.5) \cdot \tfrac{5}{2} \cdot \tfrac{2\pi}{8} \right) \right]^2 +$$

-continued $$Y_4 = \left[\sum_{k=-4}^{4} X_k \cos\left((|k| - 0.5) \cdot \frac{7}{2} \cdot \frac{2\pi}{8}\right)\right]^2 +$$

$$\left[\sum_{k=-4}^{4} X_k \sin\left(\frac{k}{|k|}(|k| - 0.5) \cdot \frac{5}{2} \cdot \frac{2\pi}{8}\right)\right]^2$$

$$\left[\sum_{k=-4}^{4} X_k \sin\left(\frac{k}{|k|}(|k| - 0.5) \cdot \frac{7}{2} \cdot \frac{2\pi}{8}\right)\right]^2$$

where $k \neq 0$, where $y_1$ to $y_4$ indicates the signal strength in four different frequency sections of the frequency range 0 to $\frac{1}{2}T$ c/s and where $x_k$ with $-4 \leq k \leq 4$ are the eight signals from the delay chain F1 to F8, which are multiplied with the coefficients resulting from the above formulae, and $y_1$ to $y_4$ are the four signals to the logic unit LO1. The output of the summing circuit S1 is connectable over a contact K to one end (input) of the delay chain at times when samples are lacking in the non-uniformly sampled signal.

In the general case with N delay elements and multiplying circuits, respectively the mathematical operation of the system is:

$$y_i = \left[\sum_{k=-N/2}^{N/2} x_k \cos\left((|k| - 0.5)(i - 0.5) \cdot \frac{2\pi}{N}\right)\right]^2 +$$

$$\left[\sum_{k=-N/2}^{N/2} x_k \sin\left(\frac{k}{|k|}(|k| 0.5)(i - 0.5)\frac{2\pi}{N}\right)\right]^2$$

where $k \neq 0$ and $1 \leq i \leq \frac{N}{2}$  N for N even and $$y_i = \left[\sum_{k=\frac{-N+1}{2}}^{\frac{N-1}{2}} x_k \cos\left(k \cdot i \cdot \frac{2\pi}{N}\right)\right]^2 +$$

$$\left[\sum_{k=\frac{-N+1}{2}}^{\frac{N-1}{2}} x_k \sin\left(k \cdot i \cdot \frac{2\pi}{N}\right)\right]^2$$

where $1 \leq i \leq \frac{N-1}{2}$ for N odd and the number of multiplication coefficient sets is $$\sum_{k=1}^{(N-g)/2}\left(\frac{N-g}{2} - k\right); \begin{cases} g = 0, N \text{ even} \\ g = 1, N \text{ odd} \end{cases}$$

It is, however, possible to have more or fewer sets than indicated by this expression, depending on the design of the logic unit L01. It is, for example, possible also to have coefficient sets for correct extrapolation of signals with frequencies in only one frequency section. As to the choice of N, this number should lie within the interval of 6 to 16. At a value of N below 6 too poor of a frequency resolution is obtained, and at a value of N above 16 quite a number of pulses are to be calculated in succession in the interstices between groups of samples.

The device shown in FIG. 2 comprises, in addition to the units F1 to F8, FA1, LO1, M1 and K according to FIG. 1, also a delay chain F21 to F35, a multiplying unit M2, a wave analyzer FA2 and a logic unit LO2. These latter units together constitute a conversion device of, in principle, the same kind as the device shown in FIG. 1. The delay chain F21 to F35 comprises fifteen delay elements, and its output is connected to the input of the delay chain F1 to F8. A switching circuit 0 is provided to shift the connections between the delay chain F21 to F35, and the wave analyzer FA2, and the multiplying unit M2 respectively two steps (two sample positions) to the common connection point of the delay chains for each sample within a group of samples, which previously has been lacking in the non-uniformly sampled signal. Hereby the conversion device F1 to F8, FA1, LO1, M1 and K will create a group of samples, and the conversion device F21 to 35, FA2, LO2, M2 and 0 will create a sample group of equal size, so that the signal, which originally was sampled non-uniformly will be sampled uniformly.

In the general case with N samples in each group and M omitted samples between the groups, the number of delay elements in the delay chain F21 to F35 is equal to $N+M-1$, and the number of delay elements in the delay chain F1 to F8 still is equal to N.

In FIG. 3 there is shown a device of the type shown in FIG. 1 and it is here the question of a system where with use of means shown in FIG. 1 a group of means on a transmitting side may be connected to a group of means on a receiving side through a connecting line.

In this system corresponding to means shown in FIG. 1 have been designated in the same way. In this system according to the invention the multiplying unit M1 together with a delay chain consisting of the delay elements F1 to F8 has been arranged on the receiving side R and the wave analyzer FA1 and the logic unit LO1 are arranged on the transmitting side T. The transmitting side has an input I and together with the said wave analyzer FA1 a further delay chain has been arranged and comprises the n elements Fa+1 ...... Fa+n (n e.g.=N). From the last element Fa+n in the lastnamed delay chain the intended sample signal goes through a switch O1 for omitting certain samples and through the conductor L1 in the connecting line to the element F1 in the delay chain F1 .... F8, which is connected to the multiplying unit M1 in the receiving side R, and is output from the system through the output U, which is connected to the delay element F8.

From the logic unit LO1 on the transmitting side a control signal Ist goes through the conductor L2 in the connecting line to the multiplying unit M1 on the receiving side R.

In the same way as in the device shown in FIG. 1 there is on the receiving side R a contact K for the same purpose as already has been stated.

As for the operation, reference is given to what has been said in connection with FIG. 1.

In the system according to FIG. 3 it may be desirable to have in interstices between groups of transferred samples, scattered samples that are transferred. FIG. 4a shows an example of the appearance of such signals with groups SG of samples. The receiving side R has now been modified so that the output of the contact K is connected to the delay chain F1 ... F8 at an intermediate point on the same, for example after two delay elements and thus between the delay elements F2 and F3, as is shown in FIG. 4b. Hereby to obtain omitted samples, such extra transferred samples may be multiplied by multiplying coefficients in the multiplying unit.

It is also possible to combine already described devices with devices for transfer of speech signal samples operating in the frequency domain instead of in the time domain. FIG. 5 shows a time-frequency-converter TFC1 (between its two chains F of delay elements) and a frequency-time-converter FTC1 (between its two chains F of delay elements). The advantage of using signals of samples in the frequency domain instead of in the time domain in the transfer is that such signals are less susceptible to disturbances. Further also known methods for data reduction of such signals may be applied.

In FIG. 6 there is shown a variant of the device shown in FIG. 5. Here there is a time-frequency-converter TFC2 and a frequency-time-converter FTC2 with their respective delay chains F. In FIG. 6 there is shown a switch O2 and this eliminates certain samples in the transferred signal of samples in the frequency domain (as many as are eliminated in the signal in the time domain at the switch O1 in FIG. 3). The frequency-time-converter FTC2 has a special arrangement. (See a paper by T. Fjällbrant: "A method for the derivation of weighting coefficient for extrapolation using a Discrete Fourier Transform with prescribed conditions in both the time and frequency domains". Proc. of the Florence Conference on Digital Signal Processing, 1975, p. 289–295.) During the conversion of signal samples in the time domain to signal samples in the frequency domain according to known methods, the number of samples in the frequency domain will be the same as the number of samples in the time domain independent of the amplitude of the sample in the time domain (even if some samples have been eliminated by the switch O1 and thus have the amplitude value 0 there will not be less samples in the frequency domain). In spite of the elimination by the switch O2 of as many samples as have been eliminated in the signal of samples by the switch O1 in the time domain it is still possible to convert the signal samples in the time domain if the frequency-time-converter FTC2 on the receiving side R performs mathematical operations of such a type that has been stated earlier in the present specification, and FTC2 thus has conditions in the time and frequency domains. The advantage with this arrangement is of course that the amount of data that must be transferred will be materially reduced as some frequency samples disappear.

What I claim is:

1. A device for converting a non-uniformly sampled signal with a short-time spectrum to a uniformly sampled signal, the device comprising:

a delay chain including an input to which the non-uniformly sampled signal is applied, an output from which the uniformly sampled signal is supplied, N number of delay means each having an input and output and providing a time delayed output signal of the signal applied to the input thereof, the delay means being connected together in series at N number of connections;

a multiplying unit including summing circuit means having inputs and an output for providing an output signal which is the sum of the input signals applied thereto, N number of multiplying circuit means each having an input and output, each input being connected to one connection between the serially connected delay means and receiving a signal therefrom and the outputs being connected to the inputs of the summing circuit means and applying output signals thereto, and store means for storing a plurality of multiplication coefficients sets for use in the multiplying circuit means, the multiplying circuit means for multiplying the signals input thereto by one selected set of the sets of multiplication coefficients in the store;

wave analyzer means having N inputs connected to the same connections of the delay means as the inputs of the multiplying circuit means and receiving signals therefrom, and having N/2 outputs providing output signals thereon;

logic means having inputs connected to the N/2 outputs of the wave analyzer means for outputting a control signal to the store means of the multiplication unit in response to a comparison of the amplitude of the signals output from the wave analyzer means to select one of the sets of multiplication coefficients for use in the multiplying circuit means;

the wave analyzer means providing output signals from the input signals according to the formulae;

$$y_i = \left[ \sum_{k=-N/2}^{N/2} x_k \cos\left( (|k| - 0,5)(i - 0,5) \cdot \frac{2\pi}{N} \right) \right]^2 +$$

$$\left[ \sum_{k=-N/2}^{N/2} x_k \sin\left( \frac{k}{|k|} (|k|\, 0,5)(i - 0,5) \frac{2\pi}{N} \right) \right]^2$$

where $k \neq 0$ and $1 \leq i \leq \frac{N}{2}$  N for N even and $$y_i = \left[ \sum_{k=\frac{-N+1}{2}}^{\frac{N-1}{2}} x_k \cos\left( k \cdot i \cdot \frac{2\pi}{N} \right) \right]^2 +$$

$$\left[ \sum_{k=\frac{-N+1}{2}}^{\frac{N-1}{2}} x_k \sin\left( k \cdot i \cdot \frac{2\pi}{N} \right) \right]^2$$

where $1 \leq i \leq \frac{N-1}{2}$ for N odd where $x_k$ with $-N/2 \leq k \leq N/2$ are the signals from the N connections of the delay chain, and $y_i$ through $y_{N/2}$ are the output signals from the wave analyzer means to the inputs of the logic means; and switch means for connecting the output of the summing circuit means to the input of the delay chain when samples are lacking in the non-uniformly sampled signal, to provide the uniformly sampled signal.

2. The device as claimed in claim 1 in which the plurality of multiplication coefficients sets are defined by the formula:

$$\sum_{k=1}^{(N-g)/2} \left( \frac{N-g}{2} - k \right) \text{ where } \begin{cases} g = 0 \text{ for } N \text{ even} \\ g = 1 \text{ for } N \text{ odd} \end{cases}$$

3. A device for converting a non-uniformly sampled signal with a short-time spectrum to a uniformly sampled signal, the device comprising:

A. a first conversion circuit including:

a first delay chain including an input, an output from which the uniformly sampled signal is supplied, N number of first delay means each having an input and output and providing a time delayed output signal of the signal applied to the input thereof, the first delay means being connected together in a series at N number of connections;

a first multiplying unit including first summing circuit means having inputs and an output for providing an output signal which is the sum of the input signals applied thereto, N number of first multiplying circuit means each having an input and output, each input being connected to one connection between the serially connected first delay means and receiving a signal therefrom and the outputs being connected to the inputs of the first summing circuit means and applying output signals thereto, and first store means for storing a plurality of multiplication coefficients sets for use in the first multiplying circuit means, the first multiplying circuit means for multiplying the signals input thereto by one selected set of the sets of multiplication coefficients in the first store means;

first wave analyzer means having N inputs connected to the same connections of the first delay means as the inputs of the first multiplying circuit means and receiving signals therefrom, and having N/2 outputs providing output signals thereon;

first logic means having inputs connected to the N/2 outputs of the first wave analyzer means for outputting a first control signal to the first store means in response to a comparison of the amplitude of the signals output from the first wave analyzer means to select one of the sets of multiplication coefficients for use in the first multiplying circuit means;

the first wave analyzer means providing output signals from the signals input thereto according to the formulae:

$$y_i = \left[\sum_{k=-N/2}^{N/2} x_k \cos\left\{(|k| - 0,5)(i - 0,5) \cdot \frac{2\pi}{N}\right\}\right]^2 +$$

$$\left[\sum_{k=-N/2}^{N/2} x_k \sin\left\{\frac{k}{|k|}(|k| 0,5)(i - 0,5)\frac{2\pi}{N}\right\}\right]^2$$

where $k \neq 0$ and $1 \leq i \leq \frac{N}{2}$ N for N even and $$y_i = \left[\sum_{k=\frac{-N+1}{2}}^{\frac{N-1}{2}} x_k \cos\left\{k \cdot i \cdot \frac{2\pi}{N}\right\}\right]^2 +$$

$$\left[\sum_{k=\frac{-N+1}{2}}^{\frac{N-1}{2}} x_k \sin\left\{k \cdot i \cdot \frac{2\pi}{N}\right\}\right]^2$$

where $1 \leq i \leq \frac{N-1}{2}$ for N odd where $x_k$ with $-N/2 \leq K \leq N/2$ are the signals from the N connections of the first delay chain, and $y_i$ through $y_{N/2}$ are the output signals from the first wave analyzer means to the inputs of the first logic means; and switch means for connecting the output of the first summing circuit means to the input of the first delay chain when samples are lacking in the non-uniformly sampled signal; and B. a second conversion circuit including:
a second delay chain including an input to which the non-uniformly sampled signal is applied, an output connected to the input of the first delay chain, N+M−1 number of second delay means where M is the number of omitted samples after a group of N samples, the second delay means each having an input and an output and providing a time delayed output signal of the signal applied to the input thereof, the second delay means being connected together in series at connections;

shifting circuit means having inputs connected to the second delay chain and receiving signals therefrom, and N number of first outputs outputting signals therefrom and N number of second outputs outputting signals therefrom;

a second multiplying unit including second summing circuit means having inputs and an output connected to the shifting circuit means, for providing an output signal which is the sum of the input signals applied thereto, N number of second multiplying circuit means, each having an input and output, each input being connected to one of the second outputs of the shifting means and receiving a signal therefrom and the outputs being connected to the inputs of the second summing circuit means and applying output signals thereto, and store means for storing a plurality of multiplication coefficients sets for use in the multiplying circuit means, the multiplying circuit means for multiplying the signals input thereto by one selected set of the sets of multiplication coefficients in the store;

second wave analyzer means having N number of inputs connected to the first outputs of the shifting means and receiving signals therefrom and having N/2 outputs proving output signals thereon;

second logic means having N/2 inputs connected to the outputs of the second wave analyzer means for outputting a control signal to the second store means in response to a comparison of the amplitude of the signals output by from the wave analyzer means to select one of the sets of multiplication coefficients for use in the multiplying circuit means;

the wave analyzer means providing output signals from the input signals substantially according to the formulae:

$$y_i = \left[\sum_{k=-N/2}^{N/2} x_k \cos\left\{(|k| - 0,5)(i - 0,5) \cdot \frac{2\pi}{N}\right\}\right]^2 +$$

$$\left[\sum_{k=-N/2}^{N/2} x_k \sin\left\{\frac{k}{|k|}(|k| 0,5)(i - 0,5)\frac{2\pi}{N}\right\}\right]^2$$

where $k \neq 0$ and $1 \leq i \leq \frac{N}{2}$ N for N even and $$y_i = \left[\sum_{k=\frac{-N+1}{2}}^{\frac{N-1}{2}} x_k \cos\left\{k \cdot i \cdot \frac{2\pi}{N}\right\}\right]^2 +$$

$$\left[\sum_{k=\frac{-N+1}{2}}^{\frac{N-1}{2}} x_k \sin\left\{k \cdot i \cdot \frac{2\pi}{N}\right\}\right]^2$$

where $1 \leq i \leq \frac{N-1}{2}$ for N odd where $x_k$ with $-N/2 \leq k \leq N/2$ are the signals from the connections of the second delay chain, and $y_i$ through $y_{N/2}$ are the signals on the inputs of the second logic means; and said shifting circuit means for shifting the connections between the second delay chain, the second wave analyzer and the second multiplying unit two steps to the common connection point between the first and second delay chains for each sample within a group of samples which previously had been lacking in the non-uniformly sampled signal, so that the first conversion circuit means creates a first group of samples which are inserted in the non-uniformly sampled signal and the second conversion device creates a second group of samples of a size equal to the first group, which are inserted in the non-uniformly sampled signal so that the non-uniformly sampled signal is uniformly sampled.

4. The device as claimed in claim 3 in which the plurality of multiplication coefficients sets are defined by the formula:

$$\sum_{k=1}^{(N-g)/2} \left( \frac{N-g}{2} - k \right) \text{ where } \begin{cases} g = 0 \text{ for } N \text{ even} \\ g = 1 \text{ for } N \text{ odd} \end{cases}$$

5. The device as claimed in claims 1, 2, 3 or 4 in which the number N is within the interval of 6 to 16.

* * * * *